US009158988B2

(12) United States Patent
Patel et al.

(10) Patent No.: US 9,158,988 B2
(45) Date of Patent: Oct. 13, 2015

(54) METHOD FOR DETECTING A PLURALITY OF INSTANCES OF AN OBJECT

(71) Applicant: SYMBOL TECHNOLOGIES, INC., Lincolnshire, IL (US)

(72) Inventors: Ankur R Patel, Palatine, IL (US); Boaz J Super, Oak Park, IL (US)

(73) Assignee: Symbol Technclogies, LLC, Holtsville, NY (US)

( * ) Notice: Subject to any disclaimer, the term of this patent is extended or adjusted under 35 U.S.C. 154(b) by 238 days.

(21) Appl. No.: 13/916,326

(22) Filed: Jun. 12, 2013

(65) Prior Publication Data

US 2014/0369607 A1 Dec. 18, 2014

(51) Int. Cl.
*G06K 9/68* (2006.01)
*G06K 9/46* (2006.01)
*G06F 17/30* (2006.01)
*G06K 9/32* (2006.01)
*G06K 9/62* (2006.01)

(52) U.S. Cl.
CPC ........ *G06K 9/4604* (2013.01); *G06F 17/30247* (2013.01); *G06F 17/30256* (2013.01); *G06K 9/3241* (2013.01); *G06K 9/4671* (2013.01); *G06K 9/6202* (2013.01); *G06K 9/6218* (2013.01); *G06K 9/6226* (2013.01)

(58) Field of Classification Search
None
See application file for complete search history.

(56) References Cited

U.S. PATENT DOCUMENTS 8,781,175 B2 * 7/2014 Wang et al. .................... 382/112
8,995,725 B2 * 3/2015 Li et al. ........................ 382/112
2003/0128876 A1 7/2003 Yamaguchi
2006/0072829 A1 * 4/2006 Cieplinski .................... 382/224
2007/0179921 A1 8/2007 Zitnick et al.
2007/0217676 A1 9/2007 Grauman
2008/0232198 A1 9/2008 Hayasaka et al.
2012/0114175 A1 5/2012 Hwang et al.
2012/0323620 A1 12/2012 Hofman et al.
2013/0011016 A1 1/2013 Haas et al.

FOREIGN PATENT DOCUMENTS

| CA | 01148234 A1 | 6/1983 |
| EP | 2136319 A2 | 12/2009 |
| KR | 2010006324 A | 1/2010 |
| KR | 0972849 B1 | 7/2010 |
| WO | 0169021 A2 | 6/2011 |
| WO | 2011069021 A2 | 6/2011 |

(Continued)

OTHER PUBLICATIONS

Li, Jia, Surajit Ray, and Bruce G. Lindsay. "A Nonparametric Statistical Approach to Clustering via Mode Identification." Journal of Machine Learning Research 8.8 (2007): 1687-1723.*

(Continued)

*Primary Examiner* — Thomas Conway

(57) ABSTRACT

An improved object recognition method is provided that enables the recognition of many objects in a single image. Multiple instances of an object in an image can now be detected with high accuracy. The method receives a plurality of matches of feature points between a database image and a query image and determines a kernel bandwidth based on statistics of the database image. The kernel bandwidth is used in clustering the matches. The clustered matches are then analyzed to determine the number of instances of the object within each cluster. A recursive geometric fitting can be applied to each cluster to further improve accuracy.

15 Claims, 9 Drawing Sheets

(56) References Cited

FOREIGN PATENT DOCUMENTS

WO 2012131181 A1 10/2012
WO 20120136642 A1 10/2012

OTHER PUBLICATIONS

Hall et al.; Local Minima in Cross-Validation Functions, Journal of the Royal Statistical Society, Series (B), Methodological, vol. 53, Issue 1; 1991; pp. 245-252.

Hall et al.; Estimation of Integrated Squared Density Derivatives, Statistics and Probability Letters, vol. 6, Issue 2; 1987; pp. 109-115.

Park et al.; Comparison of Data-Driven Bandwidth Selectors, Journal of the American Statistical Association, vol. 85, Issue 409; Mar. 1990; pp. 66-72.

Sundeep Vaddadi et al, "Keypoint Clustering for Robust Image Matching", Proceedings of SPIE, Jan. 1, 2010, ISSN: 0277-786X, pp. 77980K.

Yuhang Zhang et al, "Handling Significant Scale Difference for Object Retrieval in a Supermarket", Digital Image Computing: Techniues and Applications, 2009, Dicta '09, IEEE, Piscataway, NY, USA, Dec. 1, 2009, pp. 468-475.

International Search Report and Written Opinion mailed Oct. 22, 2014 in counterpart PCT application No. PCT/US2014/041536.

* cited by examiner

GEOMETRIC FITTING AND VERIFICATION (WITHOUT RECURSION)

GEOMETRIC FITTING AND VERIFICATION (WITH RECURSION)

1

METHOD FOR DETECTING A PLURALITY OF INSTANCES OF AN OBJECT

FIELD OF THE DISCLOSURE

The present invention relates generally to object recognition techniques and more particularly to techniques focused on the detection of multiple instances of an object within an image.

BACKGROUND

Object recognition systems are typically utilized to find a given object in an image or video sequence. Humans recognize a multitude of objects in images with little effort, despite the fact that the image of the objects may vary somewhat in different viewpoints, in many different sizes/scale or even when the objects are translated or rotated. Objects can even be recognized by humans when the objects are partially obstructed from view. Hence, object recognition systems aim to duplicate the abilities of human vision and understanding of an image.

Object recognition systems are utilized for acquiring, processing, analyzing, and understanding images and, in general, high-dimensional data from the real world in order to produce numerical or symbolic information, e.g., in the forms of decisions. This image understanding can be seen as the inference of symbolic information from image data using models constructed with the aid of geometry, physics, statistics, and learning theory. Many object recognition systems are able to recognize a single object that fills a significant part of the camera's field of view. However, a significantly harder use case presents the challenge of recognizing many objects in a single image, with high accuracy. Products that are displayed and sold on shelves are particularly difficult for current systems to recognize, because these products tend to have similar labeling across a brand, get moved around, and/or become partially blocked by each other. Current day object recognition algorithms can fail to correctly count the number of product facings.

Accordingly, there is a need for a system and method that can recognize many objects in a single image, with high accuracy.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
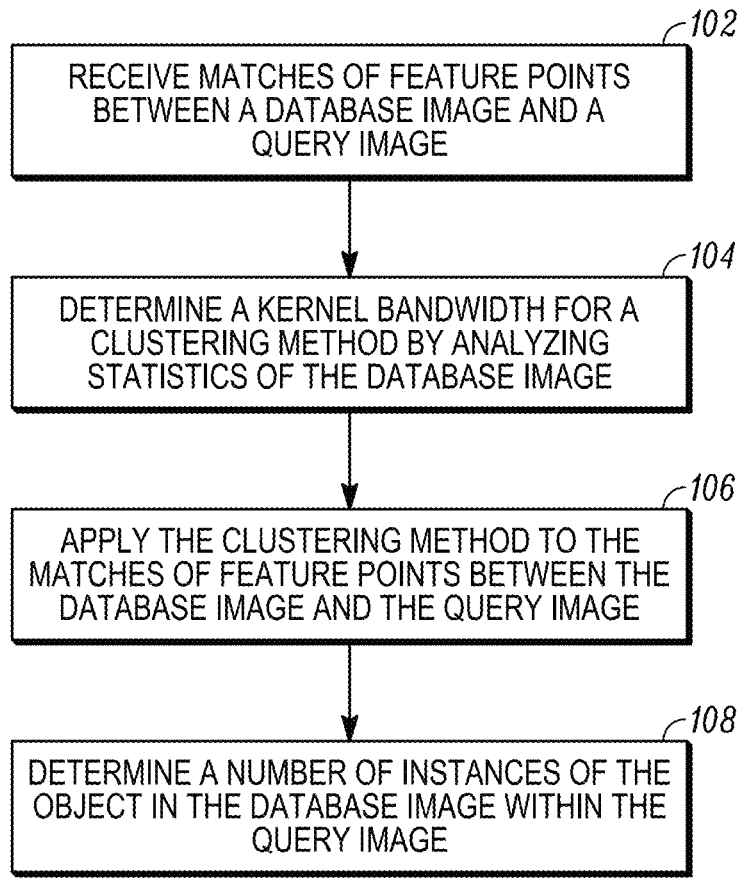
FIG. 1 is a flowchart of a method of operating an object recognition system in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, an improved object recognition method is provided which increases the accuracy of detecting multiple instances of an object within an image. Matches are obtained between a query image and a database image and then the matches are clustered using a kernel bandwidth obtained by analysis of the database image feature distribution.

FIG. 1 is a flowchart of a method 100 of operating an object recognition system in accordance with the various embodiments. Method 100 begins at 102 by receiving matches of feature points between a database image and a query image. A kernel bandwidth is then derived for a clustering method by analyzing statistics of the database image at 104. Different clustering methods may be used. The clustering method with the derived kernel bandwidth is then applied at 106 to the matches of feature points between the database image and the query image thereby generating at least one cluster. Each cluster of the at least one cluster thus comprises matched feature points. The method then continues at 108 by determining a number of instances of the object in the database image within the query image. Method 100 provides a significant improvement in accuracy through the determination of the kernel bandwidth. The kernel bandwidth facilitates the clustering which leads to the improved accuracy.

As mentioned previously different clustering methods can be used. Cluster analysis or clustering is the task of grouping a set of objects in such a way that objects in the same group (called cluster) are more similar (in some predetermined manner) to each other than to those in other groups (clusters). The clustering may comprise different clustering methods known or yet to be developed, and may be applied to different types of data. In a preferred embodiment, the type of data is spatial data resulting in a spatial clustering. Different clustering methods can be utilized, including but not limited to, mean shift, k-means, and non-parametric kernel density estimation. Clustering methods can be classified as based on specifying/determining the bandwidth parameters and/or specifying the number of clusters. The method 100 operating in accordance with the various embodiments is based on determining the bandwidth parameters at 104. Additionally, once method 100 obtains an estimate of the number of clusters (using the bandwidths determined at 104), both hard and soft clustering approaches can be employed to determine the object/point associations at 108.

Alternatives to hard and soft clustering such as finer distinction approaches can also be employed to determine the object/point associations at 108, such as: strict partitioning clustering: where each object belongs to exactly one cluster; strict partitioning clustering with outliers: objects can also belong to no cluster, and are considered outliers; overlapping clustering (also: alternative clustering, multi-view clustering): while usually a hard clustering, objects may belong to more than one cluster; hierarchical clustering: objects that belong to a child cluster also belong to the parent cluster; subspace clustering: while an overlapping clustering, within a uniquely defined subspace, clusters are not expected to overlap.

Figure 2A:
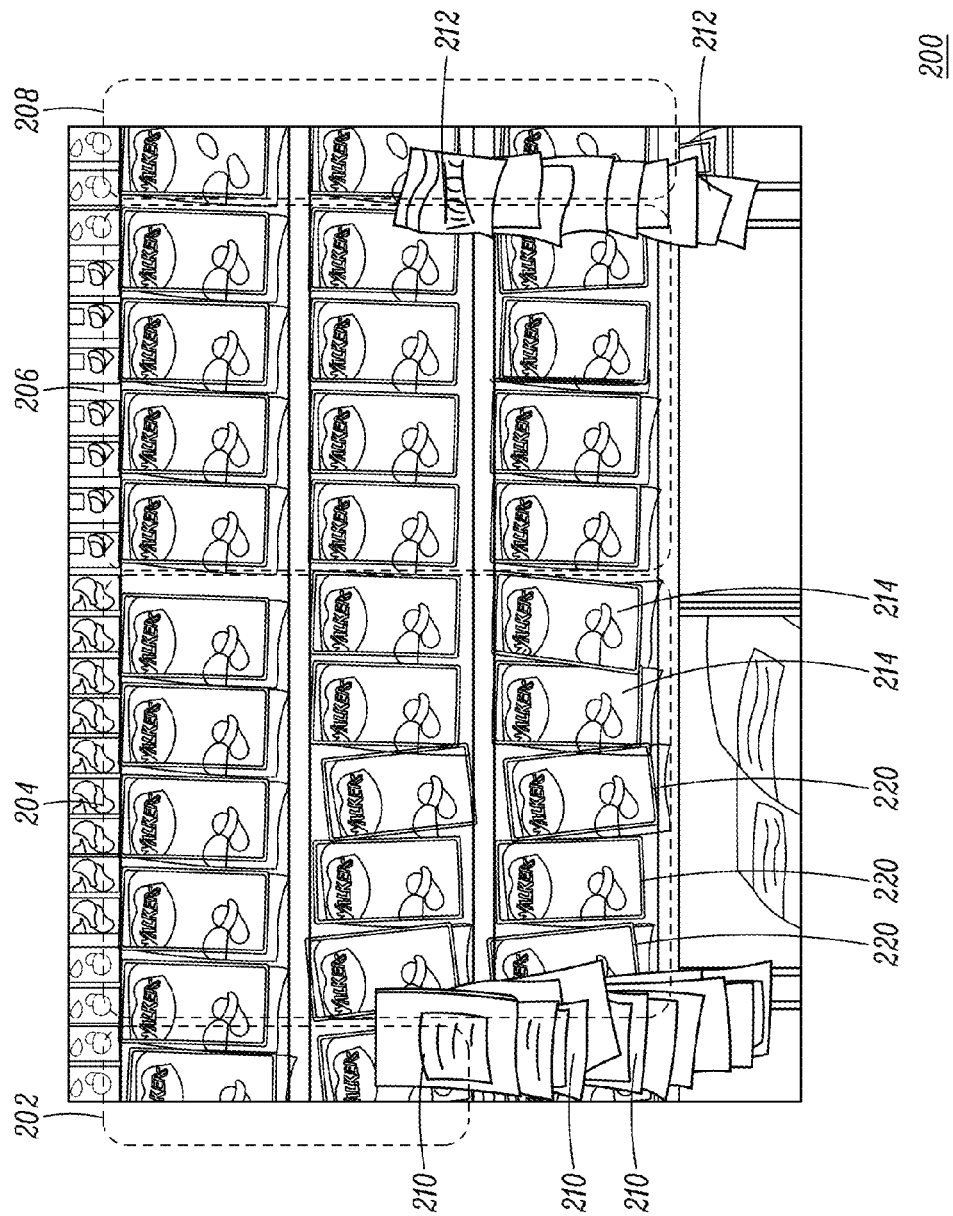
FIG. 2A is line drawing representing an image of a plurality of products displayed on a shelf being correctly detected by an object recognition system operating in accordance with the various embodiments.

The determination of an appropriate value for the kernel bandwidth at 104 to utilize in the clustering step 106 of method 100 advantageously allows for the generation of accurate business intelligence pertaining to products on a shelf FIG. 2A is line drawing representing an image 200 of a plurality of products displayed on a shelf being correctly detected by an object recognition system operating in accordance with the various embodiments. Image 200 shows four product groups being recognized, first product group 202, second product group 204, third product group 206, and fourth product group 208. A squared outline of each product item represents correct detection 220. The determination of the kernel bandwidth enables the correct detection 220, even though some of the products have been moved such that the labels are not facing completely forward, other labels are partially blocked by packages 210 and 212 and other labels overlap with each other 214.

Figure 2B:
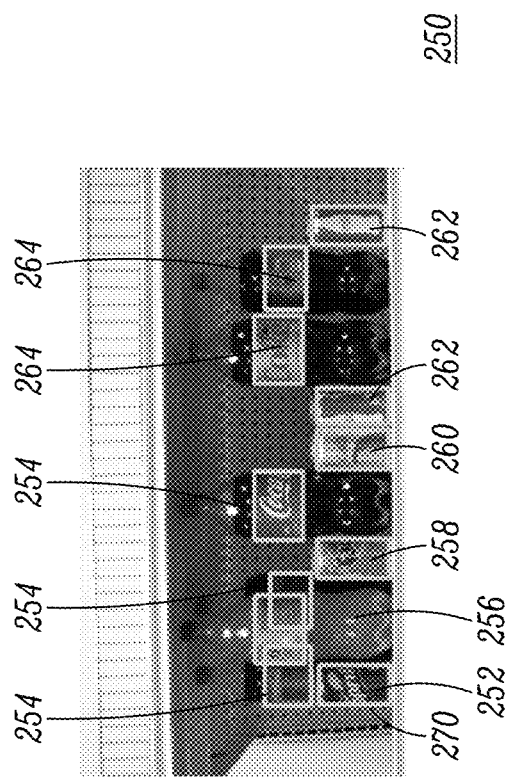
FIG. 2B is an image of a plurality of products displayed on a shelf being correctly detected by an object recognition system operating in accordance with the various embodiments.

FIG. 2B is an image 250 of a plurality of products displayed on a shelf being correctly detected by an object recognition system operating in accordance with the various embodiments. A squared outline 270 surrounding each product label item has been drawn to represent correct detection. Image 250 shows seven product groups being recognized, first product group 252, second product group 254, third product 256, fourth product 258, sixth product 260, and seventh product group 262. The determination of the kernel bandwidth enables the correct detection 270 including product labels which are not facing completely forward, labels which are partially blocked and/or other labels which overlap with each other.

Figure 3:
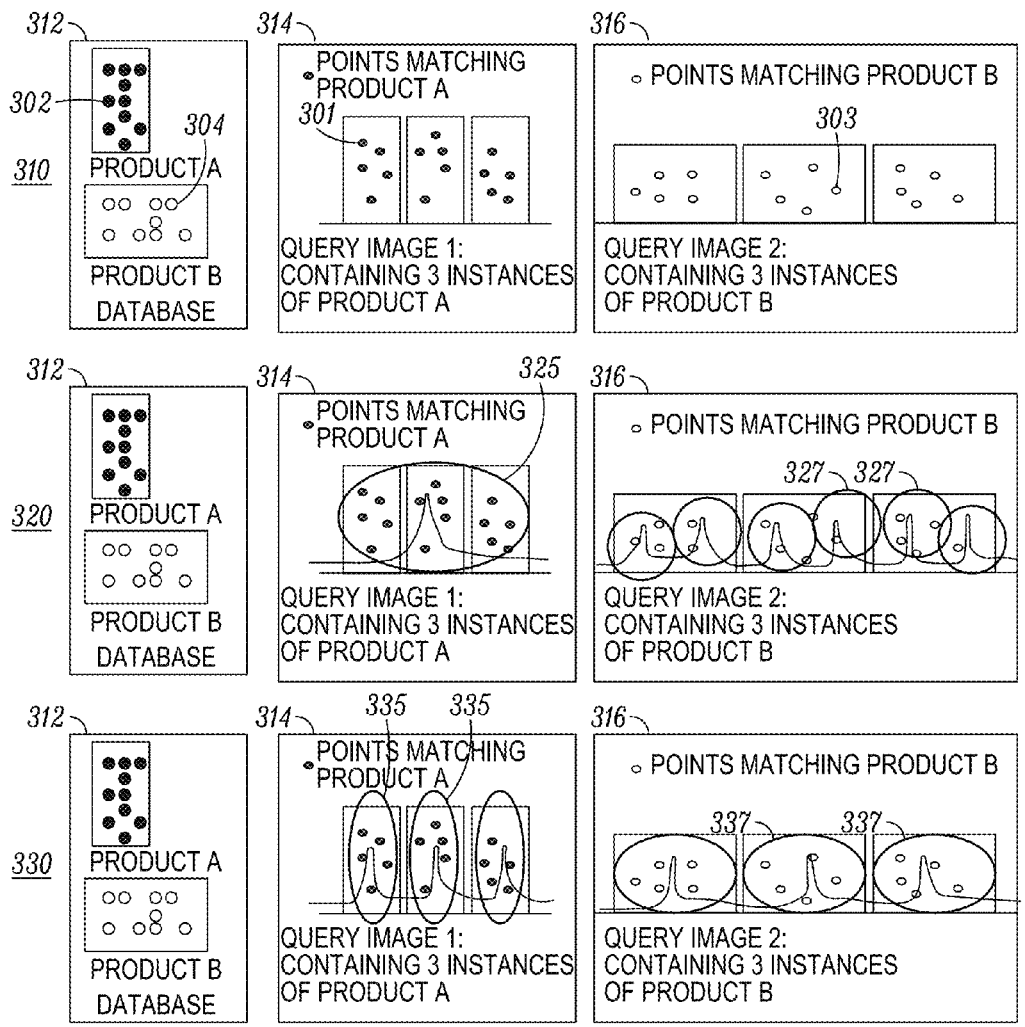
FIG. 3 illustrates a block diagram comparing clustering of feature point matches using different kernel bandwidths in accordance with the various embodiments.

Determining an appropriate value for the kernel bandwidth in the clustering step of method 100 is important. An incorrect kernel bandwidth results in clusters that do not correspond to products in the image. FIG. 3 provides a block diagram 300 illustrating the effects of different kernel bandwidths at 320 and 330 At 310, database 312 comprises reference (database) images for products A and B. A first query image 314 contains feature points 301 which match with feature points 302 in a database image of product A. The first query image 314 contains three instances of product A. A second query image 316 contains feature points 303 which match with feature points 304 in a database image of product B. The second query image 316 contains three instances of product B.

For kernel bandwidth 320, database 312 comprises feature points 302 for product A and feature points 304 for product B. The first query image 314 contains feature points 301 which match with feature points 302 in a database image of product A. The first query image 314 contains three instances of product A. However, the kernel bandwidth is too large and has produced one cluster 325 containing all three instances of product A. The second query image 316 contains feature points 303 which match with feature points 304 in a database image of product B. The second query image 316 contains three instances of product B. However, the kernel bandwidth is too small and has produced six clusters 327 for the three instances of product B.

For kernel bandwidth 330, database 312 comprises feature points 302 for product A and feature points 304 for product B. The first query image 314 contains feature points 301 which match with feature points 302 in a database image of product A. The kernel bandwidth has been adaptively computed in accordance with methods of various embodiments, to yield exactly one cluster 335 for each product A. Similarly, the second query image 316 contains feature points 303 which match with feature points 304 in a database image of product B. The second query image 316 contains exactly one cluster 337 for each product instance of product B.

Figure 4:
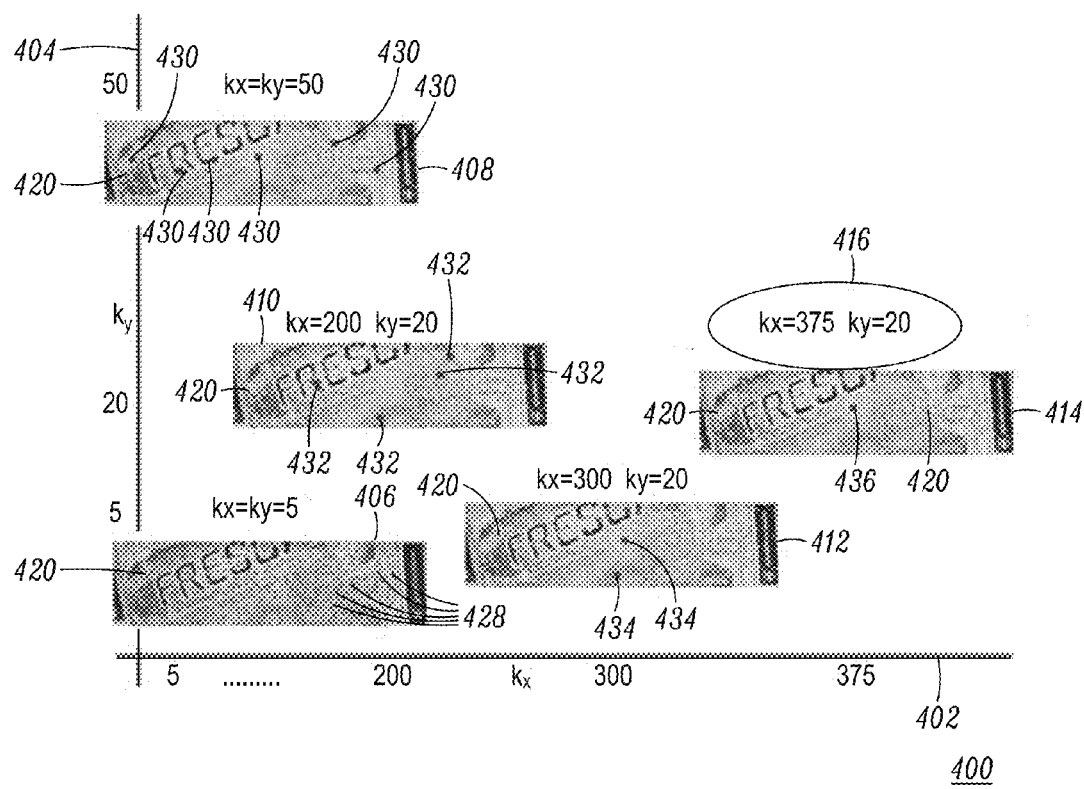
FIG. 4 shows a distribution example of a database image as the kernel bandwidth is adaptively computed in accordance with the various embodiments.

Using adaptively computed kernel bandwidths to yield exactly one cluster for each instance of a product advantageously allows for the generation of correct business intelligence about products on a shelf FIG. 4 shows a distribution 400 of a database image as the kernel bandwidth is adaptively computed in accordance with the methods of the various embodiments. The spatial point distribution of the feature points of each database image is used to determine a kernel density estimate (KDE) and to select the optimal bandwidth to be one which results in a unimodal KDE (single maximum) for that database image. This can be mathematically represented using equation 1.

$$[k_x, k_y] \text{ - - - } C(G(f k_x, k_y (p_x, p_y))) = 1 \qquad (1)$$

where, $k_x$, $k_y$—are the kernel bandwidths in the x, y direction.

$p_x$, $p_y$—are the spatial coordinates of the database image point distribution f—is the kernel density estimate G—is the function returning the modes of the density distribution C—cardinality of the modes=1 (a unimodal distribution).

Referring to distribution 400, horizontal axis 402 represents the kernel bandwidth in the x (typically horizontal) direction $k_x$, and vertical axis 404 represents the kernel bandwidth in the y (typically vertical) direction $k_y$. Again, kernel bandwidth is obtained by increasing the bandwidths (in the x, y direction) in small steps, until a unimodal distribution is found.

For example, for:

i=j=5

$k_x$=database image width $k_y$=database image height while (i≤database image width)

while (j≤database image height)

estimate fij($p_x$,$p_y$)

if (fij($p_x$,$p_y$) is unimodal)

$k_x$=i $k_y$=j return j=j+5 i=i+5

Referring to distribution 400, the light dots 420 represent database image points distributed within images 406, 408, 410, 412, and 414 as the kernel bandwidths are increased. Heavier dots 430, 432, 434, and 436 represent the maxima of the distribution. Distribution 400 shows the database image at 406 with $k_x=5$ and $k_y=5$, and having several maxima points 428 (too many to label all of them). Distribution 400 shows the database image at 408 with $k_x=50$ and $k_y=50$, and having 6 maxima points 430. Distribution 400 shows the database image at 410 with $k_x=200$ and $k_y=20$, and having four maxima points 432. Distribution 400 shows the database image at 412 with $k_x=300$ and $k_y=20$, and having two maxima points 434. Distribution 400 shows the database image at 414 with $k_x=375$ and $k_y=20$, and having a single maxima point 436. Hence, in this example, a unimodal distribution has been achieved at 414, with the kernel bandwidths ($k_x=375$ and $k_y=20$) which optimize the criterion circled at 416.

Figure 5:
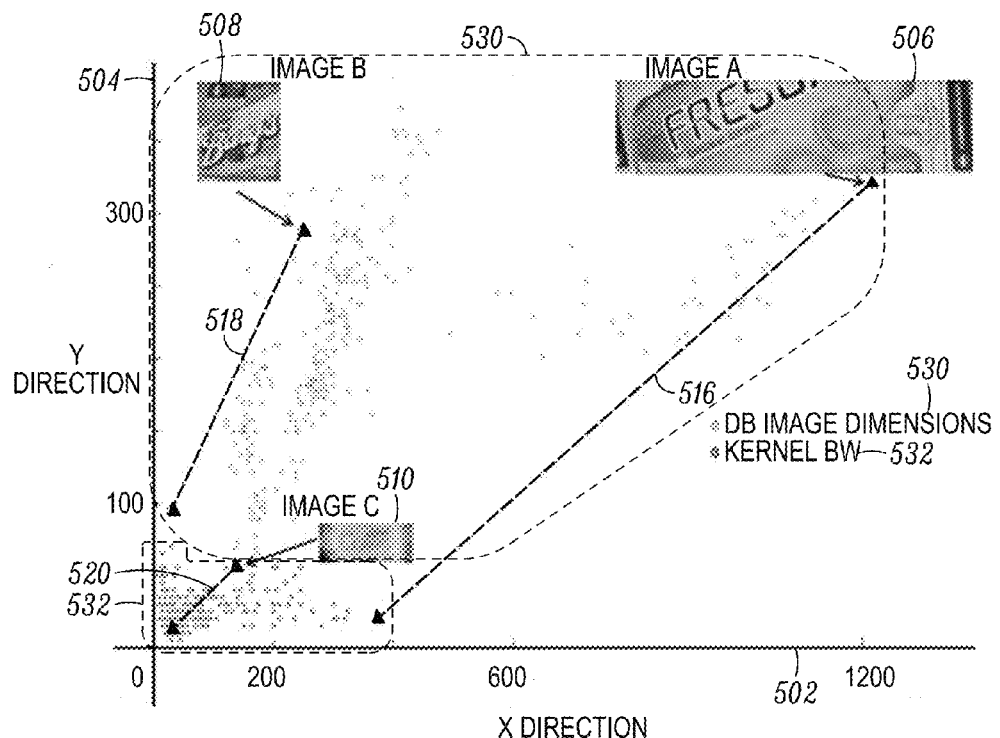
FIG. 5 illustrates an example of data for database images in accordance with the various embodiments.

Referring to FIG. 5, there is shown a plot of database image dimension (dots represented by 530) and the corresponding estimated kernel bandwidth (dots represented by 532) for 80 database product labels, obtained by using the methods in accordance with the various embodiments. This study has shown that the estimated kernel bandwidths are not simply a scaling of the database image dimensions. In other words, the kernel bandwidths obtained by method 100 are not trivially computable from the dimensions of the object to be recognized as it appears in the database image. FIG. 5 highlights the database image dimension and the corresponding estimated kernel bandwidth for three different products Image A 506, Image B 508, Image C 510 obtained by using the methods in accordance with the various embodiments. Three examples are represented by dashed line 516 for Image A, dashed line 518 for Image B, and dashed line 520 for Image C and are further indicated in the Table below as well as Table 540 in FIG. 5.

|  | DATABASE IMAGE DIMENSION (x DIM × y DIM) | KERNEL BANDWIDTH DIMENSION (x DIM × y DIM) | SCALING FACTOR (x DIM × y DIM) |
| --- | --- | --- | --- |
| Image A at dashed line 516 | 1200 × 320 | 380 × 20 | 3.15 × 16 |
| Image B at dashed line 518 | 250 × 290 | 20 × 95 | 12.5 × 3.05 |
| Image C at dashed line 520 | 140 × 60 | 20 × 10 | 7 × 6 |

The results above and shown in plot 500 indicate that the estimated kernel bandwidths are not a constant scaling of the database image dimensions.

Figure 6:
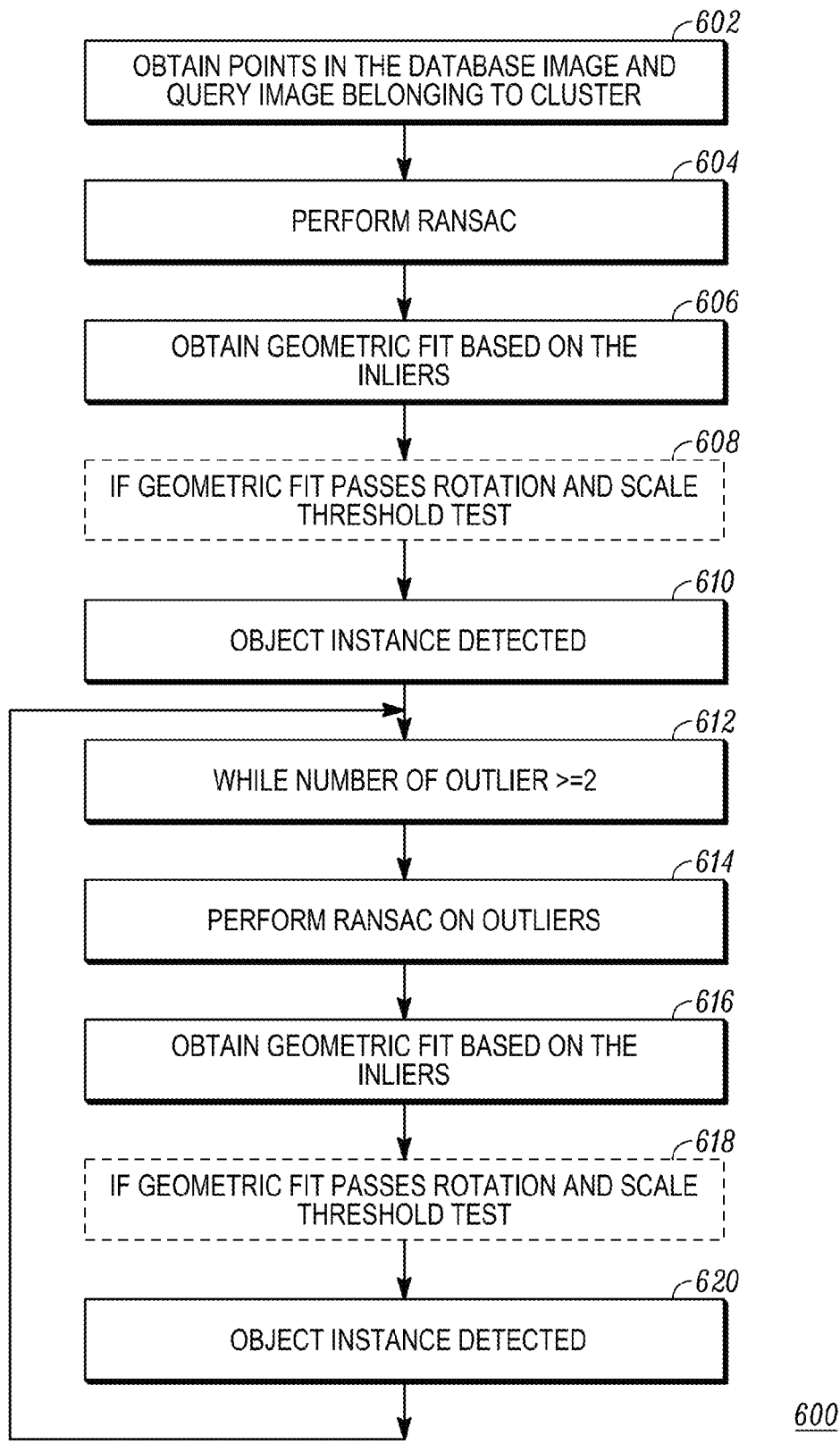
FIG. 6 is a flowchart of a method in which recursive geometric fitting and verification are added to improve the detection of an object in an image in accordance with the various embodiments.

To further improve results, a recursive geometric model fitting and verification algorithm can be applied. FIG. 6 is a flowchart of a method 600 in which recursive geometric fitting and verification are added to improve the detection accuracy of objects in an image in accordance with the various embodiments. For each cluster, a recursive application of a fitting method is applied. In a preferred embodiment, a robust fitting method would be used, for example, random sample consensus (RANSAC). Other fitting methods may alternatively be applied. The method 600 estimates the pose parameters of the object bounding boxes. Since the application is operating in 2D space (image being 2D), four pose parameters are estimated (2 translation, 1 rotation and 1 scale). The stopping criterion will be reached when there are less than two outliers remaining, as at least two matched feature points are needed to estimate the rotation, translation and scale parameters.

The RANSAC algorithm is an iterative method to estimate parameters of a mathematical model from a set of observed data which contains outliers. It is a non-deterministic algorithm in the sense that it produces a reasonable result only with a certain probability, with this probability increasing as more iterations are allowed. A basic assumption is that the data consists of "inliers", i.e., data whose distribution can be explained by some set of model parameters, though it may be subject to noise, and "outliers" which are data that do not fit the model. The outliers can come, for example, from extreme values of the noise or from erroneous measurements or incorrect hypotheses about the interpretation of data. RANSAC also assumes that, given a set of inliers, there exists a procedure which can estimate the parameters of a model that optimally explains or fits this data.

For each cluster, the method 600 begins at 602 by obtaining feature points from the database image and query image belonging to the cluster (the cluster having been formed at 106 in method 100). Performing a RANSAC at 604 on the feature points obtained from the cluster determines the identification of inliers and outliers. A geometric fit at 606 is then obtained based on the identified inliers. An optional test may be applied at 608 to filter out false positives. In a preferred embodiment, the test is an application of rotation and scale thresholds. Other thresholds or other tests may be applied. An object instance is detected at 610. While the numbers of identified outliers are greater than a predetermined threshold (of at least two) at 612, the process is repeated on the identified outliers (at 614, 616, 618, and 620).

Figure 7:
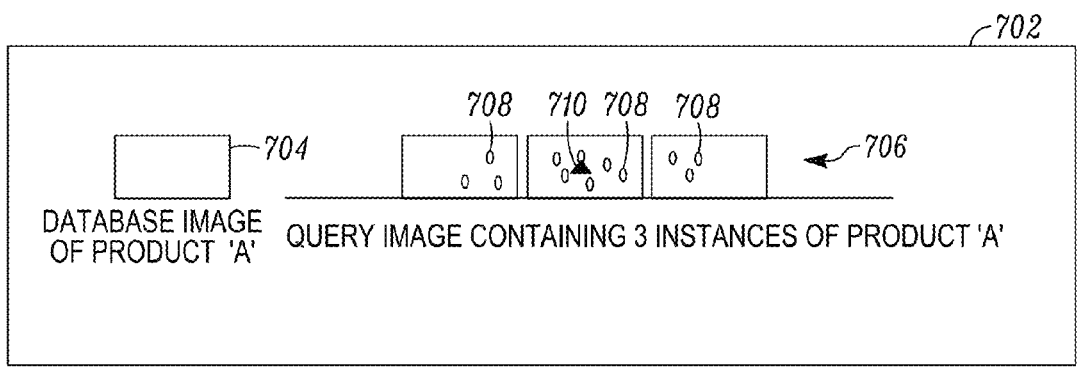
FIG. 7 is an example of an improvement obtained in the detection an object in an image by adding recursive geometric fitting and verification in accordance with the various embodiments.
Figure 7:
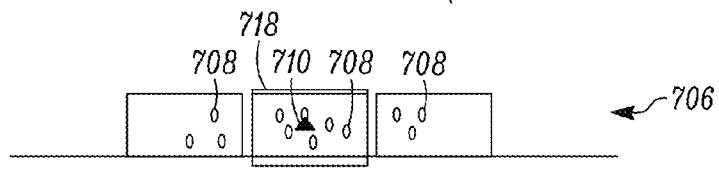
Figure 7:
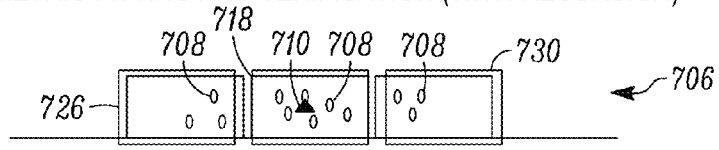

FIG. 7 is an illustration example 700 of the improvement that can be obtained in the detection of an object in an image using the recursive geometric fitting of method 600 in accordance with the various embodiments. At 702, a database image of a product, Product A, 704 along with a query image 706 containing three instances of Product A are shown. Due to the lack of some matches of query image feature points to database image feature points (represented by dots 708) the estimated density only returns one local maxima 710, instead of three, thus resulting in false negatives.

Applying the geometric fitting and verification of method 600 (without recursion—only steps 602, 604, 606, 608, 610), to query image 706 results in only one object instance being detected (outer bounding box 718), rather than three, resulting in two false negatives.

Applying the geometric fitting and verification of method 600 (with recursion—all steps in the method of 600) to query image 706, results in all three object instances being detected (outer bounding boxes 726, 718, 730).

Figure 8:
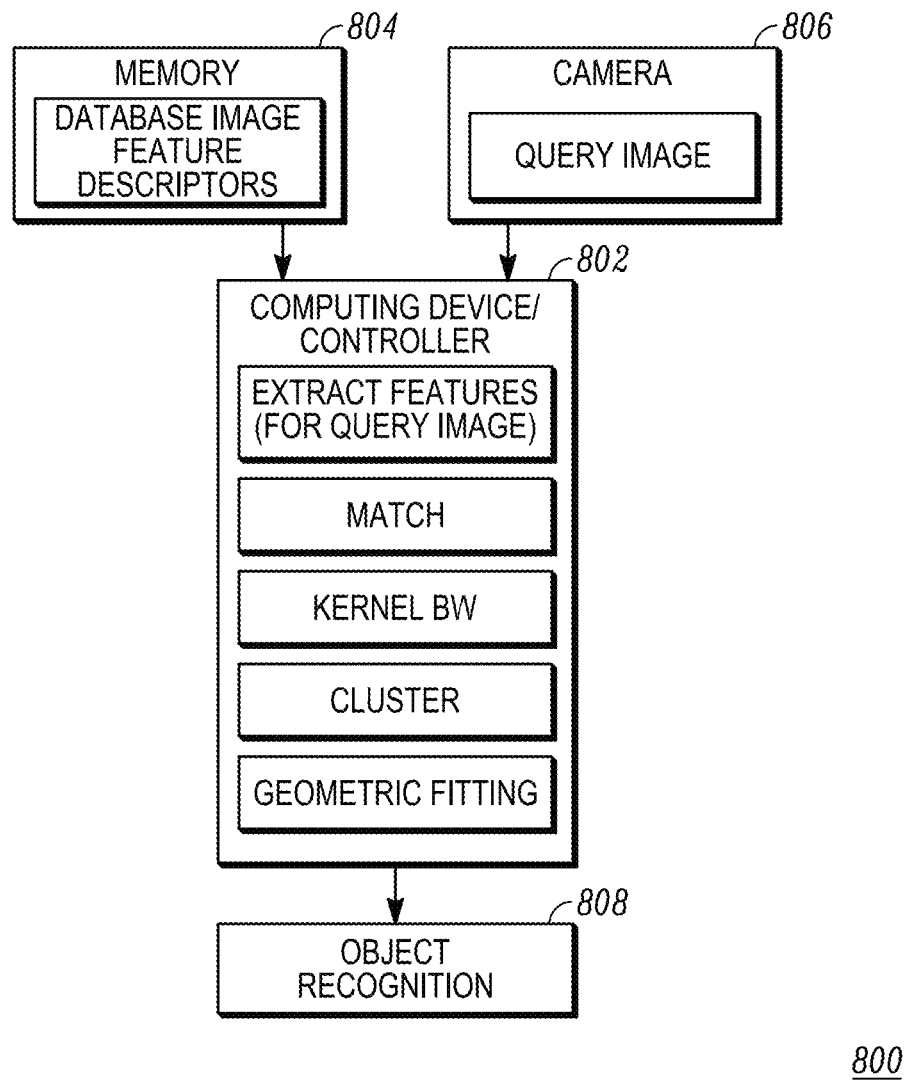
FIG. 8 is a block diagram of an object recognition system 800 utilizing the method operating in accordance with the various embodiments.

FIG. 8 is a block diagram of an object recognition system 800 utilizing the method operating in accordance with the various embodiments. The object recognition system 800 comprises a computing device 802 having a controller, a memory 804 and a camera or other device for obtaining or receiving an image. The controller receives a database image insert (along with its feature descriptors) from memory 804 and a query image 806 from a camera. The computing device 802 provides a computer implemented process for detecting an object within the query image by performing the feature descriptor extraction (for the query image), matching, kernel bandwidth determination, and clustering as provided by the previous embodiments. The computing device may further apply a recursive geometric fitting to the clusters, as previously described to increase accuracy. The result provides object recognition 808 of a plurality of objects within a single query image.

Accordingly, there has been provided an improved object recognition method which increases the accuracy of detecting multiple instances of the same product within an image. Unlike systems that derive kernel bandwidth based on the estimated query image scale or by optimizing an integrated squared error (or some variant), the object recognition provided by the various embodiments advantageously derives a kernel bandwidth as a function of the database image's feature distribution (i.e. determining a unimodal kernel density of a feature point distribution of the database image). Thus, the determination of kernel bandwidth is based on the application context of object recognition. The methods provided by the various embodiments beneficially exploit information from a database of reference images. The various embodiments are particularly beneficial when dealing with multiple instances of the same product next to each other (for example, three facings of the same type of soda can on a shelf), especially when one instance partially blocks the view of another instance. The various embodiments have been achieved without the use of template matching or sliding windows which are known to be expensive and inefficient, especially when dealing with large query images.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of determining an instance of an object in a query image, comprising the steps of:
receiving a plurality of matches of feature points between the query image and a database image;
deriving a kernel bandwidth for a clustering method by analyzing statistics of the database image;
applying the clustering method with the derived kernel bandwidth to the matches of feature points between the query image and the database image thereby generating at least one cluster; determining a number of instances of the object in the database image within the query image; and determining whether other database images are available; and repeating the steps of receiving, deriving, applying, and determining, for at least one of the other database images.

2. The method of claim 1, wherein the analyzing statistics of the database image comprises:
determining a unimodal kernel density of a feature point distribution of the database image.

3. The method of claim 1, wherein the clustering method comprises a spatial clustering method.

4. The method of claim 1, wherein determining the number of instances of the object comprises:
fitting and verifying a geometric model to each cluster of the at least one cluster to estimate an object boundary.

5. The method of claim 4, wherein fitting and verifying a geometric model comprises: recursively fitting and verifying a geometric model to each cluster of the at least one cluster to estimate an object boundary.

6. The method of claim 1, wherein receiving a plurality of matches of feature points between a query image and a database image, further comprises:
extracting features from the query image.

7. The method of claim 1, wherein the kernel bandwidth is automatically derived as a function of a feature distribution of the database image.

8. The method of claim 2, wherein the step of determining a unimodal kernel density of a feature point distribution of the database image comprises:
adaptively computing kernel bandwidths.

9. The method of claim 1, wherein the object comprises a product, the product being located on a shelf.

10. The method of claim 1, wherein estimating the kernel bandwidth is mathematically represented by:

$$[k_x, k_y] \dashrightarrow C(G(f k_x k_y (p_x, p_y))) = 1$$

where, $k_x, k_y$—are the kernel bandwidths in the x, y direction $p_x, p_y$—are the spatial coordinates of the database image point distribution f—is the kernel density estimate G—is the function returning the modes of the density distribution C—cardinality of the modes=1 (a unimodal distribution).

11. The method of claim 1, wherein the estimated kernel bandwidths are not a constant scaling of the database image dimensions.

12. A computer implemented process for detecting an object within a query image, comprising the steps of:

analyzing statistics of a database image to determine a kernel bandwidth; receiving matches of feature points between a database image and a query image; and applying clustering using the kernel bandwidth to the matches of feature points to detect the object within the query image; wherein analyzing statistics of a database image, comprises:

determining a unimodal kernel density of a feature point distribution of the database image;

determining a number of instances of the object of the database image within the query image, wherein the query image comprises multiple instances of the object; and determining whether other database images are available; and repeating the steps of analyzing, receiving, applying, and determining, for at least one of the other database images.

13. The computer implemented process of claim 12, wherein the multiple instances of the object comprises one or more of:

multiple instances placed next to each other and partially occluding or occluded by each other.

14. The computer implemented process of claim 12, further comprising:

applying a recursive geometric fitting with recursion after the clustering to obtain a plurality of inliers and outliers.

15. The computer implemented process of claim 12, further comprising:

applying a recursive geometric fitting with recursion after the clustering to further improve detection accuracy.

* * * * *